United States Patent
Asplund

(10) Patent No.: US 8,737,096 B2
(45) Date of Patent: May 27, 2014

(54) TAPPING POWER FROM A HVDC TRANSMISSION SYSTEM

(75) Inventor: Gunnar Asplund, Ludvika (SE)

(73) Assignee: ABB Technology Ltd., Zürich (CH)

( * ) Notice: Subject to any disclaimer, the term of this patent is extended or adjusted under 35 U.S.C. 154(b) by 980 days.

(21) Appl. No.: 12/524,901

(22) PCT Filed: Jan. 29, 2007

(86) PCT No.: PCT/SE2007/050041
§ 371 (c)(1),
(2), (4) Date: Dec. 28, 2009

(87) PCT Pub. No.: WO2008/094086
PCT Pub. Date: Aug. 7, 2008

(65) Prior Publication Data
US 2010/0091527 A1    Apr. 15, 2010

(51) Int. Cl.
*H02J 3/36* (2006.01)
*H02M 5/45* (2006.01)
*H02M 5/458* (2006.01)

(52) U.S. Cl.
USPC .............................................. 363/35; 363/37

(58) Field of Classification Search
USPC .................................................. 363/35, 37
See application file for complete search history.

(56) References Cited

U.S. PATENT DOCUMENTS

| 4,259,713 A * | 3/1981 | Flisberg et al. ............... 363/35 |
| 5,187,651 A * | 2/1993 | Ekstrom ....................... 363/35 |
| 2004/0218318 A1* | 11/2004 | Bijlenga et al. ................ 361/8 |
| 2007/0114954 A1* | 5/2007 | Hampo et al. ................ 318/105 |

FOREIGN PATENT DOCUMENTS

WO        WO 95/15605        6/1995

OTHER PUBLICATIONS

International Search Report, dated Sep. 10, 2007.
Written Opinion of the International Searching Authority, dated Sep. 10, 2007.
L. Chetty et al., "Parallel-Cascaded Tapping Station," *2004 International Conference on Power System Technology, POWERCON 2004*, Nov. 2004.

* cited by examiner

*Primary Examiner* — Jue Zhang
(74) *Attorney, Agent, or Firm* — Venable LLP; Eric J. Franklin

(57) ABSTRACT

An apparatus for tapping electric energy from an HVDC power transmission system includes at least one voltage source converter. The apparatus includes an intermediate ac network containing the voltage source converter, and a switching arrangement for disconnecting the intermediate ac network in dependence on the transmission direction of the HVDC power transmission system.

16 Claims, 2 Drawing Sheets

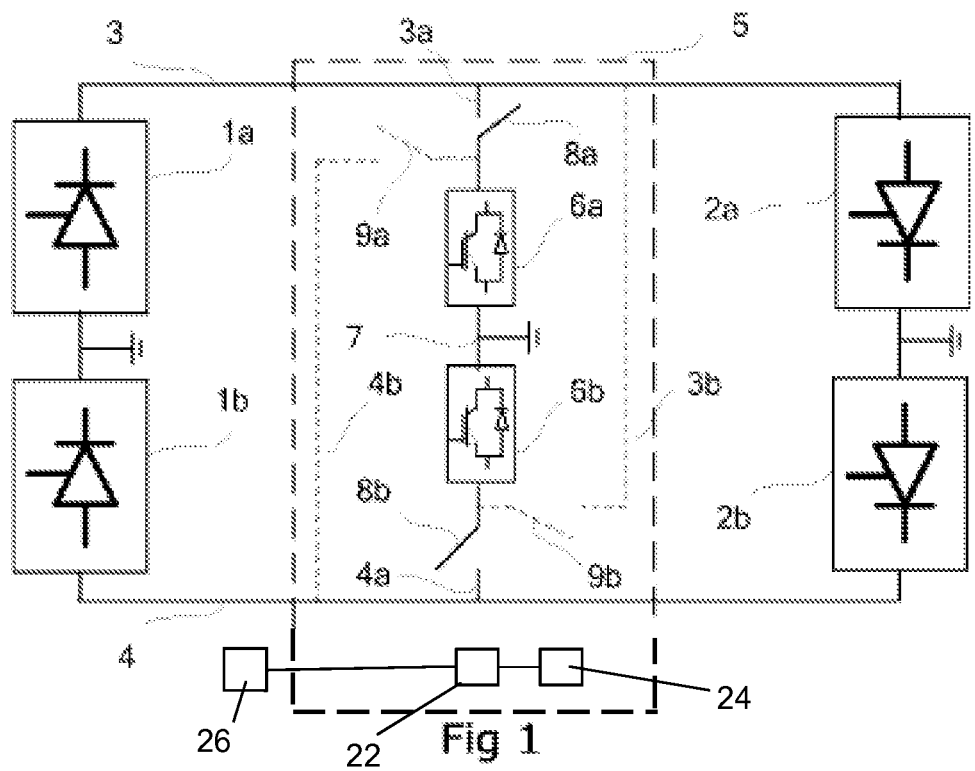
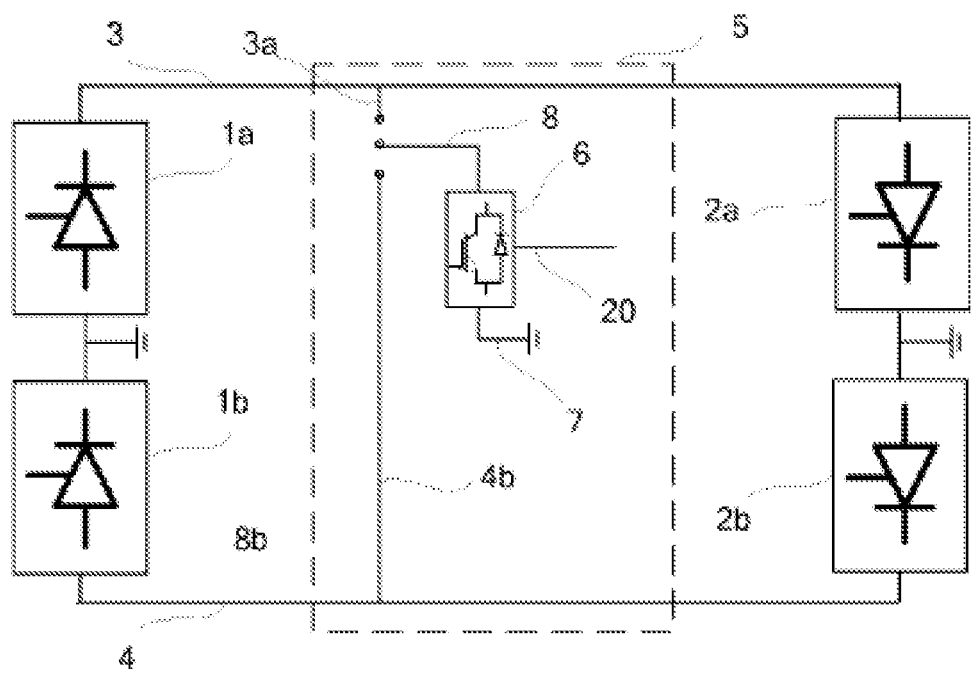
Fig 2

TAPPING POWER FROM A HVDC TRANSMISSION SYSTEM

CROSS-REFERENCE TO RELATED APPLICATIONS

This application is the national phase under 35 U.S.C. §371 of PCT/SE2007/050041 filed 29 Jan. 2007.

TECHNICAL FIELD

The present invention concerns transfer of electric power. Especially the transfer of electric power comprises High Voltage Direct Current (HVDC) lines. In particular the invention concerns tapping of electric power from an HVDC transmission line.

BACKGROUND OF THE INVENTION

HVDC is very cost efficient to transmit bulk power from distant power plants to consumers. One drawback has been the difficulty to connect loads along the line. With an ac-transmission system such connection of a load along the line may be brought about by the use of a transformer. For an HVDC transmission system such connection along the line requires a converter station having the same capacity as the receiving station. This capacity requirement would apply also for a small tap of power. Furthermore, disturbances in the ac net at the tap might, at least temporarily, interrupt the main HVDC transmission. This has in some cases led to a HVDC transmission alternative being excluded.

From U.S. Pat. No. 5,187,651 (Ekström) a system for discharging electrical power from a HVDC line to a local network is previously known. The system comprises a first converter connected in series with the HVDC line. The first converter and a second converter constitute an ac network containing a first transformer. The second converter and a third converter constitutes a dc network for feeding a local ac network via a second transformer.

From WO 9515605 (Asplund) a device for tapping electric power from a HVDC transmission line is previously known. The known system comprises a first converter connected in series with the HVDC transmission line. The first converter and a second converter located on ground potential constitute a high frequency ac network containing a first and second transformer and capacitor means for potential-separation. The second converter and a third converter constitutes a dc network for providing an ac current to a local network.

SUMMARY OF THE INVENTION

A primary object of the present invention is to seek ways to improve the tapping of electric power from a HVDC transmission system.

This object is achieved according to the invention by a control apparatus or by a method.

A current source converter (CSC) and a voltage source converter (VSC) differ from each other in that the polarity of the dc side of a CSC changes with the transmission direction, while the polarity on the dc side of a VSC is the same irrespective of the transmission direction. An HVDC transmission line is often operating in one transmission direction only. This means that the polarity of the transmission lines is always the same. If, however, the transmission direction should change and the HVDC transmission line comprises current source converters, CSC, also the polarity of the transmission lines would change. This polarity change will also affect the operation of any tapping arrangement on the dc lines.

According to the invention a tapping arrangement comprises an ac network containing VSC connected to the transmission line, and a switching arrangement to disconnect the ac network in case of polarity change on the dc transmission line. The use of VSC is very attractive since it offers full control over the reactive load as well as the possibility to change the direction of transmission. The switching arrangement comprises in an embodiment of the invention mechanically operated switches. In another embodiment the switching arrangement comprises semiconductors. In still a further embodiment the switching arrangement comprises a diode arrangement. These arrangements may preferably be used where there is a main direction of power transmission over the dc network.

In yet another embodiment of the invention the switching arrangement also comprises switches for reconnecting the ac network to the dc transmission line with changed polarity. By these arrangements the ac network may be connected almost continuously irrespective of the power transfer direction on the HVDC transmission line. In a further embodiment of the invention the ac network comprises a first and a second converter connected between a first and second HVDC transmission line. In this embodiment the midpoint is connected to earth. In yet another embodiment the tapping arrangement comprises one VSC per phase of the local ac network to be provided with power from the dc transmission line.

In a first aspect of the invention the object is achieved by an apparatus for tapping electric energy from an HVDC power transmission system comprising at least one voltage source converter (VSC), wherein the apparatus contains an intermediate ac network containing the VSC and a switching arrangement for disconnecting the intermediate ac network in dependence on the transmission direction of the HVDC power transmission system. In an embodiment of the invention the ac network comprises a plurality of VSC. In another embodiment the apparatus comprises a plurality of intermediate ac networks, each feeding power to one phase of a local ac network.

In a second aspect of the invention the object is achieved by a method for tapping electric energy from an HVDC power transmission system by connecting an ac network containing VSC, wherein the method comprises providing a switching arrangement between the HVDC power transmission system and the ac network, sensing the transmission direction of the HVDC power transmission system, disconnecting the ac network from the HVDC power transmission system as a response of a changed transmission direction.

BRIEF DESCRIPTION OF THE DRAWINGS

Other features and advantages of the present invention will become more apparent to a person skilled in the art from the following detailed description in conjunction with the appended drawings in which:

FIG. 1 is a principal circuit of a tapping arrangement according the invention, FIG. 2 is another principal circuit of a tapping arrangement containing one VSC converter station.

DESCRIPTION OF PREFERRED EMBODIMENTS

Figure 3:
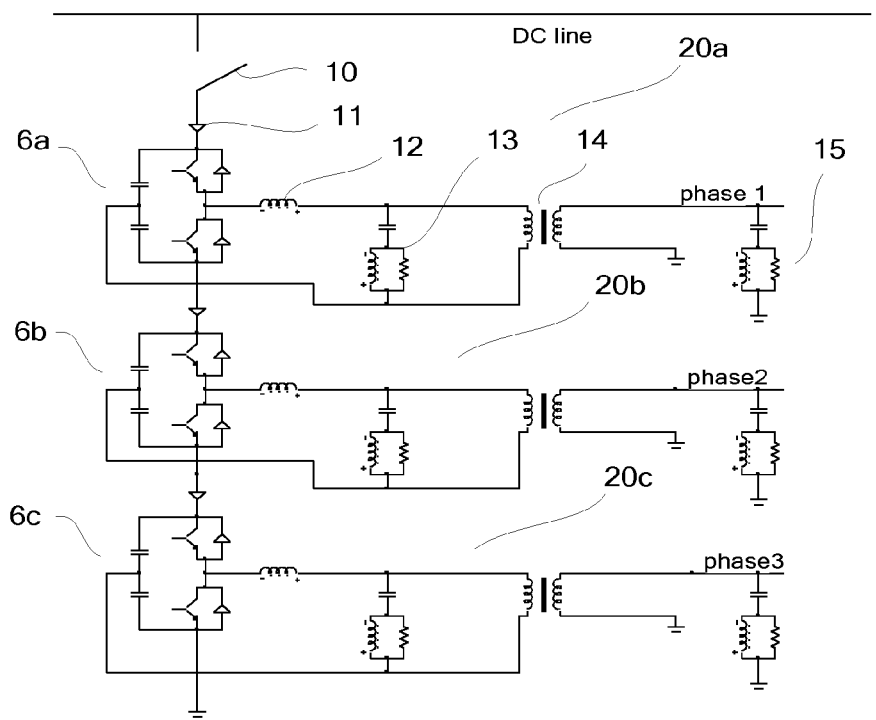
FIG. 3 is an embodiment of a tapping arrangement circuit according the invention.

An HVDC power transmission system with a tapping arrangement according to the invention is shown in FIG. 1. The HVDC power transmission system comprises a first converter station 1 with a first bridge 1a and a second bridge 1b, and a second converter station 2 with a first bridge 2a and a second bridge 2b. The first and second converter stations are connected to each other by a first transmission line 3 and a second transmission line 4. In the embodiment shown the HVDC power transmission system comprises two transmission lines and a common grounding. The invention may, however, be applied on any configuration of an HVDC power transmission system.

A tapping arrangement 5 is connectable between the first and second transmission line. The tapping arrangement comprises a first VSC containing converter bridge 6a and a second VSC containing bridge 6b, both having a common grounding point 7. The tapping arrangement also comprises a first switching arrangement containing a first switch 8a and a second switch 8b, and a second switching arrangement containing a third switch 9b and a forth switch 9a. In an operation mode the tapping arrangement is connectable to the first transmission lines via a first conductor 3a or a third conductor 3b, and to the second transmission line via a forth conductor 4a or a second conductor 4b. For control of the switching arrangement and the converters the tapping arrangement comprises computer means 22 capable of effectuating by a computer program the control of the tapping arrangement. The tapping arrangement also comprises memory means 24 for storing computer programs and control parameters. The computer program includes instructions. The instructions may be provided at least in part over a network 26. The network may be the internet.

In a first mode of operation a first branch is formed by the first conductor 3a, the first switch 8a, the first and second converter bridge, the second switch 8b and the forth conductor 4b. In a second mode of operation a second path is formed by the third conductor 3b, the third switch 9b, the first and second converter bridge, the forth switch 9a and the second conductor 4b.

Since the HVDC power transmission system comprising line commutating converters changes polarity with transmission direction any tapping system must follow the change of polarity. A tapping system containing voltage source converters always has the same polarity. Should the power direction be changed in the HVDC the VSC will have to be disconnected and reconnected with the opposite polarity. Most bulk power HVDC schemes never change transmission direction. Still Voltage Source Converters, VSC, has some interesting properties that makes it very attractive for tapping in HVDC transmissions.

A less resource demanding option of tapping system is shown in FIG. 2. The VSC is connected to one pole only of a two pole HVDC power transmission system. The switching arrangement in the embodiment shown makes the VSC being reconnectable to the opposite pole when the power direction change. In this case there will float some ground current between the tap and the rectifier station. By using the same reference numbers as in FIG. 1 the switching arrangement comprises only one switch 8, a first conductor 3a fro connection to the first transmission line and a second conductor 4b for connection to the second transmission line.

In a first mode of operation a first branch is formed by the first conductor 3a, the first switch 8, the converter bridge and the ground connection 7. In a second mode of operation a second path is formed by the second conductor 4b, the switch 8, the converter bridge and the ground connection 7. In the embodiment shown is also indicated an intermediate ac network 20 for tapping the power to a local ac network.

A further configuration of a tapping arrangement is shown I FIG. 3. In this embodiment the tapping arrangement is connected between a transmission line of a HVDC power transmission system and ground. The tapping arrangement comprises a plurality of series connected ac networks containing voltage source converters 6a, 6b, 6c, one for each phase of a local ac network (not shown). Hence each phase tapping arrangement comprises a reactor 12, and a first filter 13, a transformer 14 and a second filter 15. This tapping arrangement forms together an intermediate ac network 20. The tapping arrangement is connected to the transmission line with a circuit breaker 10. For the sake of clarity of the embodiment only the first phase tapping arrangement has reference numbers, since all three phase tapping arrangement are equally erected.

In order to minimize the amount of expensive semiconductors the plurality of VSC operates with series connected phases. When tapping of power from an HVDC power transmission system problems will arise since the operation of the HVDC rectifier will force the voltage below zero in order to extinguish the dc current if there is a dc line fault. As the VSC has diodes in anti-parallel to the self-extinguishable semiconducting elements (IGBT), this will imply that the voltage at the tap cannot be brought below zero. In order to solve this problem each phase tapping arrangement comprises a diode 11.

The diodes are located one per phase and will prevent current to flow from the tap into the dc line when the dc line has low voltage. This will have the effect that faults in the ac net at the tap will have no other influence on the HVDC than that the inverter will take over the power in the tap. Voltage wise there is no interference.

Figure 4:
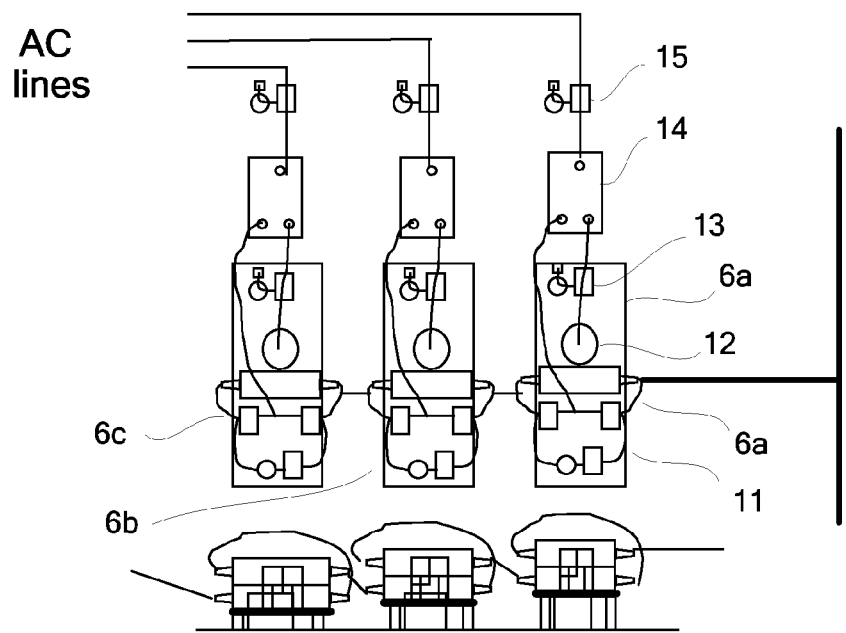
FIG. 4 is a principal layout of a tapping arrangement according the invention.

According to an embodiment of the invention the tapping arrangement is built as an outdoor station as shown in FIG. 4. All reference numbers are the same as in FIG. 3.

The following advantages can be noted:
Low cost by using only one string of semiconductors from pole to ground.
Low cost and simplified local work by using easily transportable outdoor equipment and no valve hall.
No serious interference from the tap to the HVDC possible.
VSC can operate against black ac networks or very weak ac networks and keep the ac voltage constant which is very important in remote areas.

Although favorable the scope of the invention must not be limited by the embodiments presented but contain also embodiments obvious to a person skilled in the art.

The invention claimed is:

1. An apparatus for tapping electric energy from an HVDC power transmission system, comprising:
   at least one voltage source converter,
   an intermediate ac network comprising the voltage source converter, and
   a switching arrangement configured to disconnect the at least one voltage source converter and the intermediate ac network from the HVDC power transmission system in dependence on a transmission direction of the HVDC power transmission system.

2. An apparatus according to claim 1, further comprising:
   a plurality of intermediate ac networks, each feeding power to one phase of a local ac network.

3. An apparatus according to claim 1, wherein the switching arrangement comprises a switch configured to reconnect the at least one voltage source converter and the intermediate ac network with changed polarity to the transmission system, such that a direction of current flow through the at least one voltage source converter and the intermediate ac network does not change regardless of the polarity of the HVDC transmission system.

4. An apparatus according to claim 1, further comprising: a switch configured to form a first current path.

5. An apparatus according to claim 1, further comprising: a switch configured to form a second current path.

6. The apparatus according to claim 1, wherein the apparatus is connected between a first converter station and a second converter station of the HVDC power transmission system.

7. The apparatus according to claim 6, connected to at least one transmission line between the first converter station and the second converter station.

8. A method for tapping electric energy from an HVDC power transmission system by connecting an intermediate ac network comprising a voltage source converter, the method comprising:
   providing a switching arrangement between the HVDC power transmission system and the intermediate ac network,
   forming a first current path between the HVDC power transmission system and the intermediate ac network including the voltage source converter,
   sensing a transmission direction of the HVDC power transmission system, and
   disconnecting the ac network including the voltage source converter from the HVDC power transmission system as a response of a changed polarity of the transmission system.

9. The method for tapping electric energy according to claim 8, further comprising:
   forming a second path including the voltage source converter in response to a changed polarity of the transmission system.

10. The method according to claim 8, further comprising: connecting the apparatus between a first converter station and a second converter station of the HVDC power transmission system.

11. The method according to claim 10, wherein the apparatus is connected to at least one transmission line between the first converter station and the second converter station.

12. The method according to claim 8, further comprising:
   reconnecting the at least one voltage source converter and the intermediate ac network with changed polarity to the transmission system, such that a direction of current flow through the at least one voltage source converter and the intermediate ac network does not change regardless of the polarity of the HVDC transmission system.

13. A computer program product, comprising:
   a non-transitory computer readable medium; and
   computer program instructions recorded on the computer readable medium and executable by a processor for making the processor carry out a method comprising providing a switching arrangement between an HVDC power transmission system and an intermediate ac network comprising a voltage source converter, forming a first current path between the HVDC power transmission system and the intermediate ac network including the voltage source converter, sensing a transmission direction of the HVDC power transmission system, and disconnecting the ac network including the voltage source converter from the HVDC power transmission system as a response of a changed polarity of the transmission system.

14. The computer program product according to claim 13, wherein the computer program instructions are provided at least in part over a network.

15. The computer program product according to claim 14, wherein the network comprises the internet.

16. The computer program product according to claim 13, wherein the computer program instructions are for making the processor carry out a method further comprising reconnecting the at least one voltage source converter and the intermediate ac network with changed polarity to the transmission system, such that a direction of current flow through the at least one voltage source converter and the intermediate ac network does not change regardless of the polarity of the HVDC transmission system.

* * * * *